United States Patent
McDermott

(10) Patent No.: US 6,820,366 B1
(45) Date of Patent: Nov. 23, 2004

(54) AUTOMATICALLY ADJUSTABLE FISHING LURE

(76) Inventor: Stephen Patrick McDermott, 600 Pond View Ct., Mendota Heights, MN (US) 55120

(*) Notice: Subject to any disclaimer, the term of this patent is extended or adjusted under 35 U.S.C. 154(b) by 0 days.

(21) Appl. No.: 10/449,886

(22) Filed: Jun. 2, 2003

(51) Int. Cl.[7] .............................................. A01K 85/00
(52) U.S. Cl. ...................... 43/42.22; 43/42.47; 43/26.2
(58) Field of Search ............................ 43/42.22, 42.47, 43/26.2

(56) References Cited

U.S. PATENT DOCUMENTS

| | | | | |
|---|---|---|---|---|
| 1,182,010 A | * | 5/1916 | Heddon ..................... | 43/42.47 |
| 1,200,135 A | * | 10/1916 | Reynolds .................. | 43/42.22 |
| 1,220,921 A | * | 3/1917 | Wilson ...................... | 43/42.22 |
| 1,232,211 A | * | 7/1917 | Burkman ................... | 43/42.22 |
| 2,277,453 A | * | 3/1942 | Alton ........................ | 43/42.22 |
| 2,494,384 A | * | 1/1950 | Gadzinski et al. ......... | 43/42.22 |
| 2,495,134 A | * | 1/1950 | Roberts ..................... | 43/42.22 |
| 2,561,750 A | * | 7/1951 | Overton .................... | 43/42.22 |
| 2,578,786 A | * | 12/1951 | Davis ........................ | 43/42.22 |
| 2,580,733 A | * | 1/1952 | Cowden ................... | 43/42.22 |
| 2,608,016 A | * | 8/1952 | Shipley .................... | 43/42.22 |
| 2,755,592 A | * | 7/1956 | Bocchino .................. | 43/42.22 |
| 2,789,386 A | * | 4/1957 | Creelman .................. | 43/42.22 |
| 2,817,920 A | * | 12/1957 | Mitchell et al. ............ | 43/26.2 |
| 2,900,754 A | * | 8/1959 | Roman ..................... | 43/42.47 |
| 3,367,057 A | * | 2/1968 | Pond ......................... | 43/42.47 |
| 3,902,267 A | * | 9/1975 | Monchil ................... | 43/42.47 |
| 4,050,180 A | * | 9/1977 | King ............................. | 43/4 |
| 4,215,507 A | * | 8/1980 | Russell ..................... | 43/42.22 |
| 4,225,952 A | * | 9/1980 | Lewis ....................... | 367/112 |
| 4,536,985 A | * | 8/1985 | Caviness ................... | 43/26.2 |
| 4,761,910 A | * | 8/1988 | Ninomiya ................. | 43/42.22 |
| 4,807,387 A | * | 2/1989 | Dougherty et al. ........ | 43/42.22 |
| 4,944,112 A | * | 7/1990 | Garmany et al. .......... | 43/42.22 |
| 4,995,009 A | * | 2/1991 | Altmire et al. ............. | 43/17.1 |
| 5,201,884 A | * | 4/1993 | Nicholas .................... | 43/26.1 |
| 5,351,538 A | * | 10/1994 | McGuire et al. ............. | 43/4 |
| 5,469,739 A | * | 11/1995 | McGuire ...................... | 43/4 |
| 5,546,362 A | * | 8/1996 | Baumann et al. .......... | 367/173 |
| 5,581,930 A | * | 12/1996 | Langer ...................... | 43/17 |
| 5,834,641 A | * | 11/1998 | Sternal ......................... | 43/4 |
| 5,887,376 A | * | 3/1999 | Currier et al. ............. | 43/17 |
| 6,041,539 A | * | 3/2000 | Huang ....................... | 43/42.22 |
| 6,101,758 A | * | 8/2000 | Finley ....................... | 43/42.22 |
| 6,122,854 A | * | 9/2000 | Kinnear .................... | 43/42.22 |
| 6,189,256 B1 | * | 2/2001 | Boys ......................... | 43/26.2 |
| 6,581,319 B2 | * | 6/2003 | West ......................... | 43/26.2 |
| 6,684,556 B1 | * | 2/2004 | Arbuckle et al. .......... | 43/26.2 |

FOREIGN PATENT DOCUMENTS

| | | | |
|---|---|---|---|
| JP | 2000-139274 B1 | * | 5/2000 |
| WO | WO-95/03691 A1 | * | 2/1995 |
| WO | WO-99/21416 A1 | * | 5/1999 |

OTHER PUBLICATIONS

"Processor—a whatis definition", Available web site: http://whatis.techtarget.com/definition/0,,sid9_gci212833,00.html, Accessed on: Feb. 22, 2004.*

"Microprocessor—a whatis definition", Available web site: http://whatis.techtarget.com/definition/0,,sid9_gci212568,00.html, Accessed on: Feb. 22, 2004.*

* cited by examiner

Primary Examiner—Darren W. Ark
(74) Attorney, Agent, or Firm—Thomas B. Tate

(57) ABSTRACT

A fishing lure that is automatically adjustable in order to maintain the lure at an optimum depth in a body of water. The lure has a central processing unit, a sender/receiver, and a depth varying mechanism. In response to signals from the sender/receiver, the central processing unit sends signals to control the depth varying mechanism in order to maintain the lure at a constant distance either the bottom or the surface of the body of water.

7 Claims, 2 Drawing Sheets

AUTOMATICALLY ADJUSTABLE FISHING LURE

BACKGROUND OF THE INVENTION

The field of the invention is fishing lures, specifically lures that can automatically maintain a certain distance from the surface of a body of water or automatically maintain a certain distance from the bottom of a body of water.

An important part of fishing is the art of presentation. Anglers attempt to consistently present their bait or lure in areas where fish are most likely to be located, in order to increase the opportunity to catch more fish. Typically game fish will be located near baitfish that serve as a source of food. Baitfish find safety from predators by suspending in a school or relating to structure. Predatory fish either suspend near schools of baitfish or swim near structure, especially depth changes, so as to better ambush their prey. Knowing this predatory fish behavior, anglers use various approaches and tools to present their lures to fish suspended at a certain depth, or have their lures follow a changing bottom contour in order to catch fish relating to the change in depth structure.

Today anglers have a variety of manual tools and associated approaches at their disposal to aid in improving the presentation of their lure. Anglers use devices such as maps of lakes, Global Positioning Service (GPS) devices, and on-shore landmarks to help them position their boat. Anglers have speed tools such as gas motors, electric motors, wind socks, and anchors to help them adjust the speed of their presentation. Anglers also have depth tools such as sonar depth finders. Finally, anglers have tackle tools such as the type and thickness of line (mono, lead-core, braided, super-braided, etc.), the amount of line let out in the water, and the amount and size of weights.

One of the most difficult challenges an angler faces is to make selections of these tools that together will make the presentation of his or her lure in front of the fish at the right depth. It is important to note that selections are made in an ever-changing environment. Wind speed and wind direction change, boat direction changes, line selection may change, and water depth changes. The angler's ability to select and use the right combination of tools in making a successful presentation is what typically differentiates successful anglers from unsuccessful anglers.

It would be desirable for an angler to have a lure that is smart about presentation, that is, a lure that automatically adjusts to environmental factors such as speed, line type, water depth, etc., in order to maintain a predetermined distance from either the surface or the bottom of the body of water. Various water depth monitoring devices have been available, examples of which are disclosed in the following U.S. Pat. No. 4,995,009 to Altmire et al., U.S. Pat. No. 5,351,538 to McGuire et al., and U.S. Pat. No. 5,581,930 to Langer. However, there are no known lures in the prior art that have the ability to automatically adjust in order to operate at a predetermined desired distance from the surface or the bottom, regardless of changing conditions.

SUMMARY OF THE INVENTION

The invention contains a means (preferably a transducer) for determining the distance from the lure to the surface or the bottom of the body of water, a means (preferably a microprocessor chip and special micro-code) for receiving distance signals and determining necessary auto-adjustment instructions, a means for varying the depth of the lure (preferably a mechanical lip controlled by the microchip, which sends commands to adjust the size and pitch of the lip), a means (preferably a battery) to power the lure components, and a means for specifying the distance from the surface or the bottom that the lure should run (this could be either a predetermined factory setting or an angler-operated distance selector on the lure).

The object of the invention is to solve the presentation problem by providing a smart self-adjusting lure that is able to automatically maintain a desired distance from the surface or from the bottom of a body of water.

DETAILED DESCRIPTION OF THE INVENTION

Figure 1:
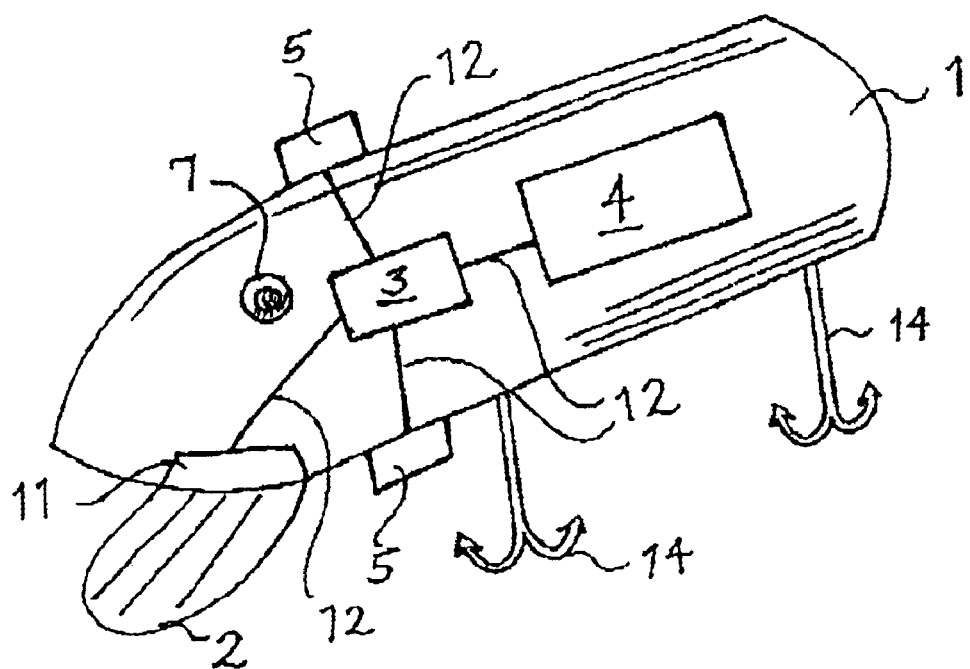
FIG. 1 is a left side view of the invention. The lure shown is a transparent version in order to reveal the components within.
Figure 2:
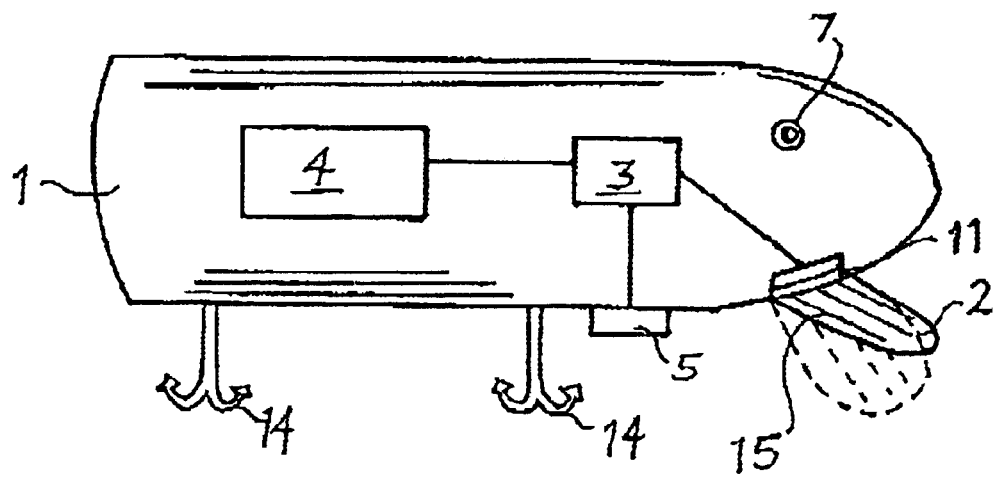
FIG. 2 is a right side view of the invention. In this view, the broken lines represent a moved position of the lip 2, wherein the lip position shown in broken lines is for running the lure at a deeper depth, and the lip position shown in solid lines is for running the lure at a shallower depth.
Figure 3:
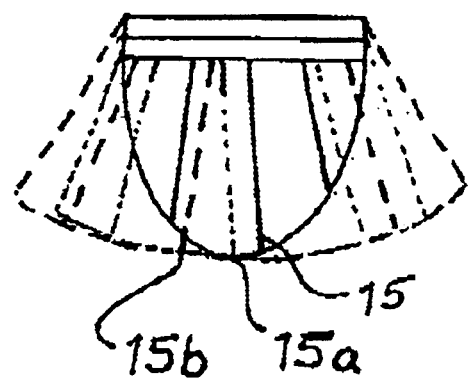
FIG. 3 is a front view of the expandable fan-shaped lip in various positions. The dark solid lines identified by the reference number 15 indicate the position of the folds when the lip is at rest. The light broken lines 15a show the position of the folds when the lip is partially expanded. The darker broken lines 15b show the position of the folds when the lip is fully expanded.

The invention is a crankbait fishing lure that is automatically adjustable in order to always run the lure at the optimum depth for catching fish in a body of water. The optimum depth is a predetermined constant distance from an identifiable series of points, said identifiable series of points being either the bottom of the body of water or the surface of the body of water. In the preferred embodiment of the invention, the lure has a housing 1, an adjustable lip 2, a central processing unit (CPU) 3, a battery 4, a transducer 5, and a depth selector 7.

The housing 1 may be of any streamlined aerodynamic shape that allows it to run easily through the water. The housing 1 may be transparent, translucent, or opaque, and may be made of any suitable waterproof materials. Hooks 14 are attached to the bottom of the housing 1 for catching fish. The fishing line (not shown) may be attached to the housing 1 in any conventional manner, commonly near the front end of the housing 1.

The lip 2 projects downwardly and outwardly from the bottom surface of the housing 1 through a slit-like opening and is attached to the inside of the housing 1 by a lip controller 11. The size and pitch of the lip 2 are adjustable. The lip 2 may be fan-shaped or may have other expandable shapes. When the lip 2 is expanded, the lure runs at a deeper depth, and when the lip 2 is contracted, the lure runs at a shallower depth. When the pitch of the lip 2 is increased (pitch becomes steeper), the lure runs at a deeper depth. When the pitch of the lip 2 is decreased, the lure runs at a shallower depth.

The depth selector is set to enable the lure to run at a predetermined optimum depth. The depth selector may include a depth selector knob 7 or other adjustment mechanism that is mounted on the outside of the housing 1, as shown, to allow the angler to select the optimum depth, or the depth selector may be pre-set at the factory, by for example, coding the desired depth into the microchip in the CPU 3, in which case there is no external adjustment mechanism.

The central processing unit (CPU) 3 and the battery 4 are disposed within the housing 1. One or two sender/receivers 5, usually transducers but other devices that send and receive signals to determine the distance from the bottom or the surface of the body of water may be used, are located preferably attached to the outer surface of the housing 1, but may be disposed within the housing 1. Lures designed to run at a constant distance from the bottom of a body of water will have one sender/receiver 5 on the bottom of the housing 1. Lures designed to run at a constant distance from the surface of a body of water will have one sender/receiver 5 on the top of the housing 1. Two sender/receivers 5, as shown, may be used in deluxe models that can be run at either a constant distance from the bottom of the body of water or at a constant distance from the surface of the body of water, as the angler may choose. Wires 12 connect the CPU 3 to the battery 4, to the transducer 5, and to the lip controller 11.

The CPU 3 contains a microchip. The microchip has a custom firmware micro-code to receive the distance from the surface or the bottom of the body of water and to determine instructions to send to the lip controller 11 and lip 2 in order to maintain the desired distance from the surface or the bottom in response to changing conditions.

The battery 4 provides power to the CPU 3, to the transducers 5, and to the lip controller 11. The battery 4 is small, for example a AAA or watch battery, and long-lasting, for example nickel-cadmium. It is desirable that the battery 4 be replaceable, and the housing 1 can be provided with a mechanism, for example an O-ring, to allow the housing 1 to be opened for battery replacement.

The transducer 5 sends signals to the bottom or the surface of the body of water to determine distance. Normally it will not be necessary to send signals down more than eight to ten feet, since anglers generally prefer that the lure run not less than two feet nor more than eight feet off the bottom. These signals are relayed to the CPU 3, which sends instructions to the lip controller 11 to adjust the size and pitch of the lip 2 to maintain the optimum depth. The transducer 5 has a leveling mechanism that adjusts the transducer 5 while the lure is moving through the water in order for the transducer 5 to point straight down or slightly forward to accurately measure distance from the bottom, or straight up or slightly forward to accurately measure distance from the surface, as the angle of the lure may change during use.

The foregoing description illustrates the best mode of carrying out the invention, and is offered by way of example and not by way of limitation. It is intended that the scope of the invention include all equivalents that perform the same function in substantially the same way to achieve substantially the same result.

I claim:

1. A crankbait fishing lure that is automatically adjustable to maintain said lure at an optimum depth for catching fish in a body of water, said lure comprising:

a housing;

means for varying the depth of said lure in said body of water, said depth varying means connected to said housing;

controlling means comprising a central processing unit (CPU) having a microchip therein, said Central Processing Unit (CPU) being disposed within said housing and connected to said depth varying means;

wherein said depth varying means comprising an expandable lip having a lip controller formed as a part thereof, and wherein said Central Processing Unit (CPU), serves as a means for controlling the size and pitch of said lip;

sender/receiver means attached to a surface of said housing and connected to said Central Processing Unit (CPU), said sender/receiver means being capable of sending and receiving signals to and from an identifiable series of points in order to determine the distance therefrom;

wherein in response to said sender/receiver signals, said Central Processing Unit (CPU) sends signals to said depth varying means in order to maintain said lure at said optimum depth, said optimum depth being a constant distance from said identifiable series of points;

depth selector means set to enable said lure to run at said optimum depth;

a power source disposed within said housing and connected to said Central Processing Unit (CPU).

2. The lure of claim 1 wherein said identifiable series of points is the bottom of said body of water.

3. The lure of claim 1 wherein said identifiable series of points is the surface of said body of water.

4. The lure of claim 1 wherein said sender/receiver means comprises a transducer.

5. The lure of claim 1 wherein said power source comprises a battery.

6. The lure of claim 1 wherein said depth selector means comprises a software program in said microchip.

7. The lure of claim 1 wherein said depth selector means comprises an adjustment mechanism mounted on the outside surface of said housing.

* * * * *